United States Patent [19]

Ryham

[11] Patent Number: 4,755,258
[45] Date of Patent: Jul. 5, 1988

[54] METHOD AND APPARATUS FOR DEACTIVATING SPENT LIQUOR

[75] Inventor: Rolf Ryham, Sollentuna, Sweden

[73] Assignee: Ahlströmföretagen Svenska AB, Norrköping, Sweden

[21] Appl. No.: 868,065

[22] Filed: May 29, 1986

[30] Foreign Application Priority Data

Jun. 6, 1985 [SE] Sweden ................................ 8502807

[51] Int. Cl.⁴ ........................ B01D 1/26; B01D 3/06
[52] U.S. Cl. .................................. 159/47.3; 159/2.3; 159/18; 159/20.1; 159/DIG. 8; 202/174; 202/185.2; 203/88; 162/46; 162/47
[58] Field of Search ....................... 159/47.3, 2.1, 2.3, 159/47.1, 17.1, 18, 20.1, DIG. 8, DIG. 13, DIG. 22; 162/46, 47; 203/88, 71; 202/174, 177, 185.2

[56] References Cited

U.S. PATENT DOCUMENTS

| | | | |
|---|---|---|---|
| 2,044,095 | 6/1936 | Moore | 159/47.3 |
| 2,544,885 | 3/1951 | Jocoby et al. | 159/17.1 |
| 2,744,571 | 5/1956 | Mair | 159/47.3 |
| 2,801,168 | 7/1957 | Goddard | 159/17.1 |
| 2,803,589 | 8/1957 | Thomas | 202/185.2 |
| 3,179,159 | 4/1965 | Jafs | 159/47.3 |
| 3,286,763 | 11/1966 | Jacoby | 159/2.1 |
| 3,463,216 | 8/1969 | Miles | 159/47.3 |
| 3,647,638 | 3/1972 | Osdor | 203/11 |
| 3,692,634 | 9/1972 | Othmer | 203/11 |
| 3,783,095 | 1/1974 | Jafs et al. | 159/47.3 |
| 4,017,421 | 4/1977 | Othmer | 159/47.3 |
| 4,401,510 | 8/1983 | Olson et al. | 162/47 |

FOREIGN PATENT DOCUMENTS 0072045 2/1983 European Pat. Off. ........... 159/47.3
139118 2/1953 Sweden .

OTHER PUBLICATIONS

Thomas M. Grace, "Evaporator Scaling", Southern Pulp and Paper Manufacturers, Aug. 1977, pp. 16, 17, 20, 22 and 23.

Primary Examiner—S. Leon Bashore
Assistant Examiner—V. Manoharan
Attorney, Agent, or Firm—Toren, McGeady & Associates

[57] ABSTRACT

Calcium containing sulphate spent liquor is deactivated by means of heating. Spent liquor is heated by means of direct condensing in a flash-steam-system. Liquor vapors generated during expansion of the already deactivated spent liquor are used for heating the spent liquor. Spent liquor is led to a retention tank through n+1 in series connected direct condensers (DK I-DK V) and from the retention tank through n in series connected flash tanks (FT I-FT IV) disposed counter-currently to the direct condensers. In the last one of the direct condensers (DK V) the liquor is heated by means of externally supplied steam; in all others (DK I-DK IV) by means of expansion vapor.

15 Claims, 3 Drawing Sheets

METHOD AND APPARATUS FOR DEACTIVATING SPENT LIQUOR

The present invention relates to a method for deactivating spent liquor by means of heating, especially calcium containing sulfate spent liquor from cellulose cooking. The invention also relates to an apparatus for carrying out the method.

How to evaporate spent liquor with a high content of dissolved calcium is a long known problem. The critical dry solids content in which Ca precipitates to $CaCO_3$ varies but is mainly 40%, the temperature being ca. 90°–100° C. with great scaling problems as a result.

A method that has been suggested to eliminate this problem has been to deactivate spent liquors by means of heating them up to ca 150° C., the retention time being ca 15–30 min. For closer details on the method we refer to Grace, T.M., Evaporator scaling, Southerns Pulp and Paper Manufacturer, 40 (1977) 8:16–23.

Heating can be accomplished by means of direct heating with steam. This results, however, in decreased dry solids content of the spent liquor and steam consumption.

A regenerating heat exchange system has been suggested in order to achieve a tolerable heat economy. This means, of course, that the scaling problem is transferred from evaporation to the regenerative heat exchangers.

The object of the present invention is to achieve an improved system to deactivate sulphate spent liquors containing calcium.

The method according to the invention is characterized in that liquor vapors generated during expansion of the deactivated spent liquor are used for direct heating of the spent liquor. The apparatus for the application of the invention is characterized in that it comprises n+1 direct condensers in series, of which the direct condenser n+1 is connected to a spent liquor inlet of a retention tank, and n flashtanks in series disposed counter-currently in relation to the direct condensers, of which flashtanks the flashtank 1 is connected to a spent liquor outlet of the retention tank, and that the direct condenser 1 is connected to a vapor outlet of the flash tank n and the direct condenser n is connected to a vapor outlet of the flash tank 1 when again the direct condenser n+1 is connected to a pipe for live steam supply.

BRIEF DESCRIPTION OF THE DRAWINGS:

The invention is described in detail in the following with reference to the accompanying drawings in which.

Figure 1:
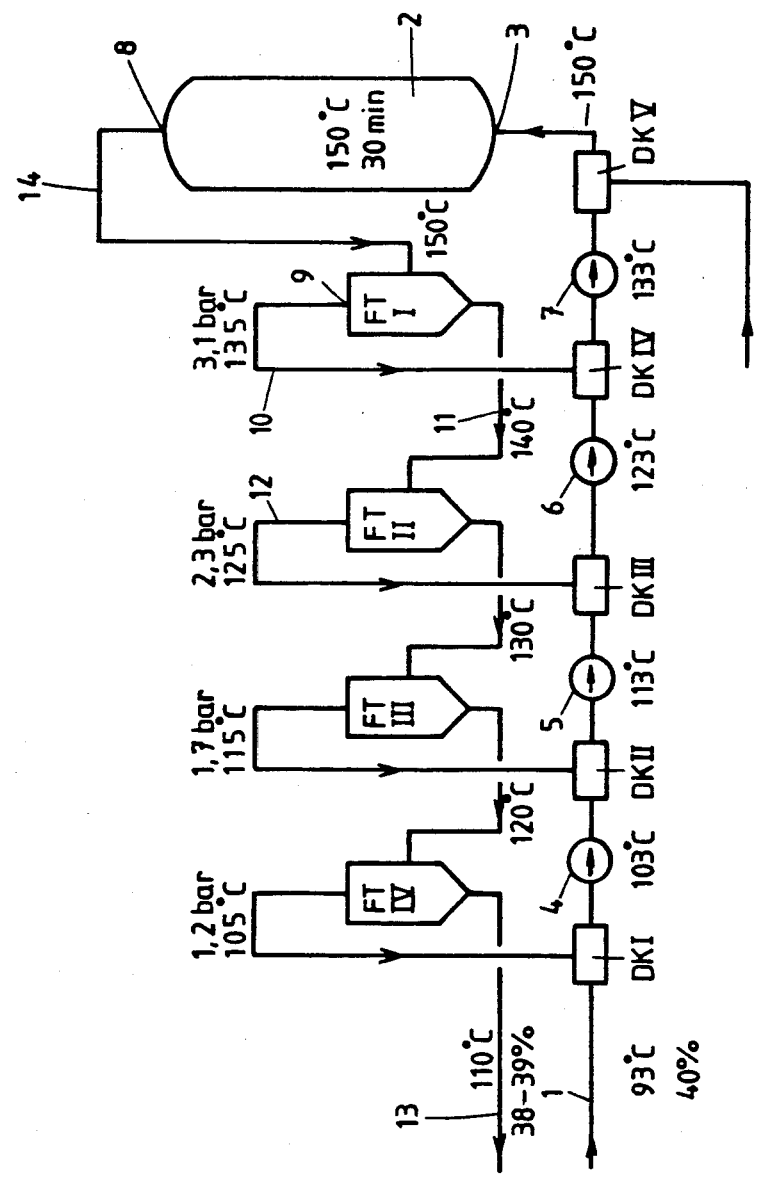
FIG. 1 shows a schematical embodiment of the invention.

In the application of the invention shown in FIG. 1., black liquor 1 that is to be treated under pressure is supplied via n+1 in series connected direct condensers DK I–DK V to an inlet 3 of a retention tank 2. Pressure is increased successively between each direct condenser by means of pumps 4–7. After a suitable retention time for Ca precipitation, e.g. 30 min. the spent liquor is discharged from the retention tank via an outlet 8 to the first one of n flash tanks FT 1, in which the pressure is lower than in the retention tank, whereby water in the deactivated spent liquor 14 is partly discharged in form of vapor. Liquor vapor 10 from the vapor outlet 9 of this flash tank I is led to the last but one direct condenser DK IV. Spent liquor 11 is led to the next flash tank FT II in which the pressure is lower than in FT I. Liquor vapor 12 from this flash tank is led to the direct condenser DK III. The spent liquor is led the same way through in series connected flash tanks FT III and FT IV from which liquor vapors are led to the direct condensers DK II and DK I respectively. As shown in the figure spent liquor is fed in at a temperature of 93° C. It is gradually heated up to 133° C. by means of liquor vapors and up to 150° C. at the last direct condenser stage DK V by means of live steam. In the flash tanks the temperature gradually decreases to 110° C. The dry solids content of the supplied spent liquor 1 and of the discharged spent liquor 13 is ca 40% and ca 38–39% respectively.

Figure 2:
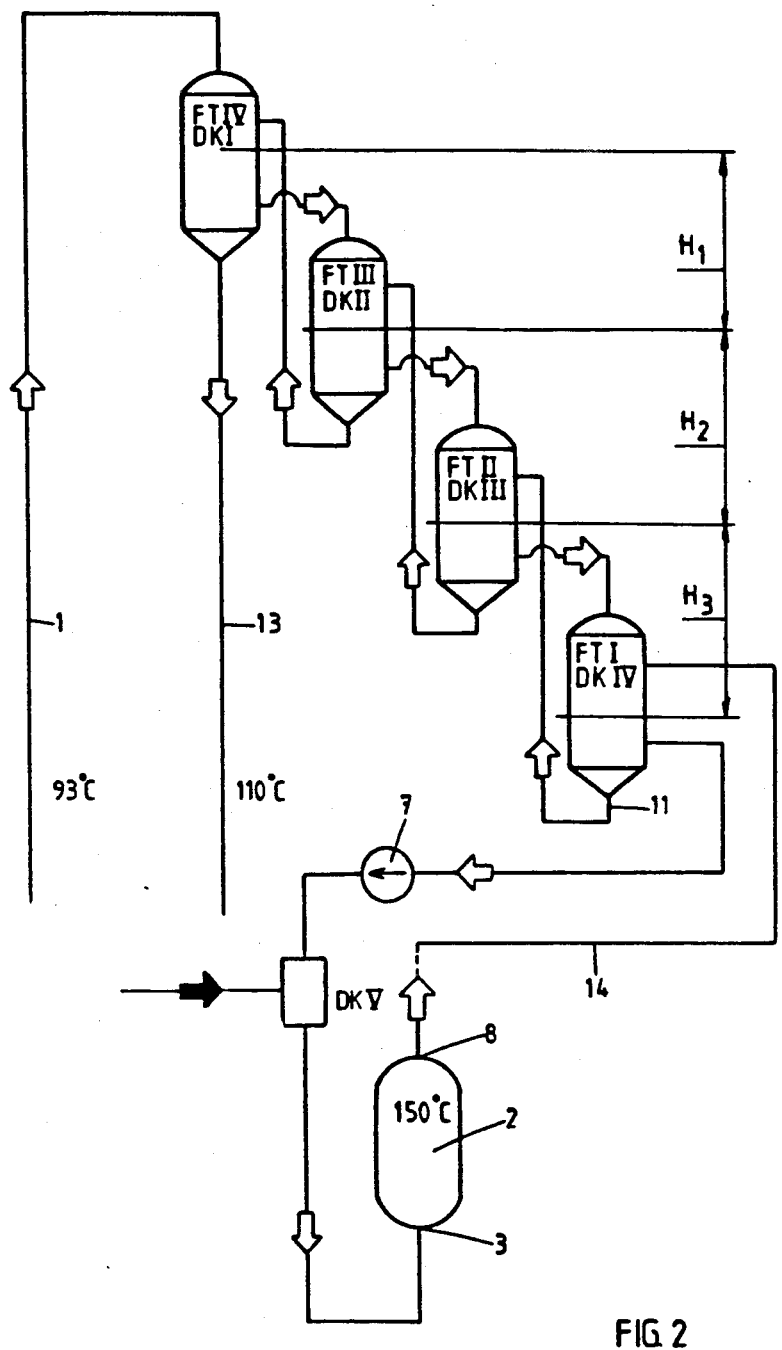
FIG. 2 shows an other schematical embodiment of the invention and FIG. 3 shows a vertical section of an apparatus for the application of the embodiment in FIG. 2.

The embodiment according to FIG. 2 differs from the embodiment of FIG. 1 mainly in that the direct condensers and flash tanks connected by means of a steam pipe are built to form one unit and that in order to accomplish a pressure difference between the direct condensers they are placed with such a difference in level that all pumps but the last 7 are eliminated. Consequently the direct condenser DK I and the flash tank IV form a first unit, DK II and FT III a second, DK III and FT II a third and DK IV and FT I a fourth. The differences in level $H_1$, $H_2$ and $H_3$ between the condenser parts DK I, DK II, DK III and DK IV are 5, 6 and 8 m respectively.

Figure 3:
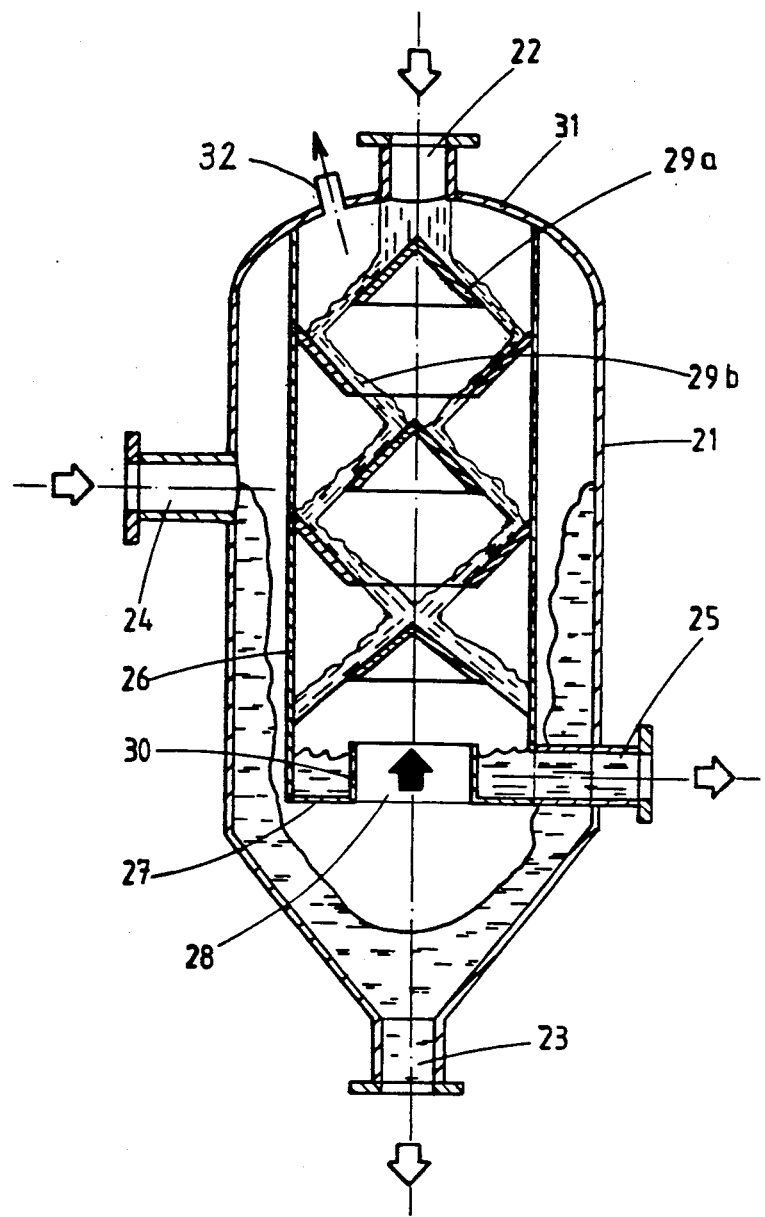

FIG. 3 shows one of the direct condensers and flash tanks built to form a unit in FIG. 2. The apparatus comprises a container 21 provided with an inlet 22 and an outlet 25 for undeactivated liquor as well as an inlet 24 and an outlet 23 for deactivated liquor. Inside this container is disposed a condenser chamber comprising of a cylindrical wall 26 and a bottom 27 with an inlet 28 for vapor. In the upper end of the condenser chamber the container forms an end wall 31 with an inlet 22. To the lower end of the container is connected an outlet 25 for undeactivated liquor.

The deactivated spent liquor is fed into the container via an inlet 24 and may expand, when vapor is released and flows via an inlet 28 into the lower end of the condenser chamber. The undeactivated spent liquor is fed in via an inlet 22 and flows through the condenser chamber guided by a plurality of inner and outer baffles 29a and 29b counter-currently to the vapor which thereby condensates and generates heat. The heated spent liquor is discharged via an outlet 25 in the lower end of the condenser chamber. A ring-formed separation wall 30 is disposed in its lower end in order to prevent the heated spent liquor to flow out via a vapor inlet. The vapor flows out of vapor outlet 32 in end wall 31.

The quantity of the steam from an external steam system is 3–3.5% of the liquor flow. With four expansion stages ca. 70% of the supplied heat is recovered. A still better heat economy is achieved by building additional expansion stages.

One of the advantages of the method is that a large part of the condensated vapor is reevaporated which means that the dry solids content of the spent liquor remains nearly unchanged. No heat exchange surfaces are needed which eliminates the problem with encrustation and the resulting periodical acid washing.

The invention is not limited to the above embodiments but it can be modified and applied within the inventive concept defined by the claims.

What is claimed is:

1. Apparatus for deactivating spent liquor, comprising:
    a plurality of flash tanks for expanding deactivated liquor, comprising n flash tanks connected in series, wherein n is a positive integer;
    a plurality of direct condensers, comprising n+1 direct condensers, connected in series including a first condenser into which undeactivated spent liquor is fed, and a last condenser from which undeactivated spent liquor flows;
    each of said flash tanks comprising a vapor generating portion, said vapor generating portion of each of said flash tanks operatively connected to one of said condensers for direct heating of said undeactivated spent liquor, except said last condenser; and
    the liquor flowing from said last condenser operatively connected to a retention tank disposed between said last condenser and a liquor inlet to a first of said series of flash tanks.

2. Apparatus as recited in claim 1 wherein said flash tanks in series include a first flash tank and a last flash tank, and wherein said vapor generating portion of said last flash tank is operatively connected to said first condenser, and said vapor generating portion of said first flash tank is connected to the second to last condenser.

3. Apparatus as recited in claim 2 further comprising a live steam inlet to said last condenser.

4. Apparatus as recited in claim 1 wherein at least one of said flash tanks and the condenser with which it is associated are built in a common unit which includes a condenser chamber disposed inside a flash tank so that vapor expanded in said flash tank comes into direct heat exchange relationship with liquor flowing in said condenser.

5. Apparatus as recited in claim 4 wherein said flash tank container includes: a deactivated liquor inlet in a side portion thereof; a deactivated liquor outlet from a bottom portion thereof; a vapor outlet from a top portion thereof; a condenser disposed therein in between said deactivated liquor outlet and said vapor outlet; an undeactivated liquor inlet to said condenser disposed in the top portion of said container; and an undeactivated liquor outlet from said condenser disposed in a side portion of said container.

6. A combined flash tank and condenser assembly comprising:
    a container provided with an inlet and an outlet for deactivated spent liquor;
    a condenser chamber mounted within said container, said chamber defined in part by a top wall of said container and having a side wall, said chamber including an inlet for undeactivated spent liquor in the top wall of the container within said chamber, and an outlet for undeactivated liquor disposed in the lower portion of said chamber and extending outwardly through said side wall of said container;
    said chamber including a vapor inlet in communication with the lower portion of said container and a vapor outlet in the top wall of said container within said chamber, and a plurality of alternately arranged inner and outer baffles within said chamber for guiding undeactivated liquor from said chamber liquor inlet to said chamber liquor outlet whereby said undeactivated liquor flows countercurrent to vapor flow in said chamber.

7. A combined flash tank and condenser assembly as defined in claim 6, wherein said vapor inlet is located in the bottom wall of said chamber and includes an upstanding wall for preventing liquor from flowing out of the chamber through said vapor inlet.

8. A combined flash tank and condenser assembly for use in deactivation of spent liquors comprising:
    a container having a vertically arranged cylindrically shaped first side wall and including top and bottom walls at the opposite ends of said side wall, said container provided with an inlet in the side wall thereof for introducing deactivated spent liquor into said container, and an outlet in the bottom wall for removal of deactivated spent liquor;
    a condenser chamber mounted concentrically within said container and including a cylindrically shaped second side wall, and a bottom wall, the top of said condenser chamber being closed by said container top wall;
    said condenser chamber including an inlet in said top wall for introducing undeactivated liquors into said condenser chamber, and an outlet for said undeactivated liquors adjacent the bottom wall of said chamber, and a vapor inlet in the bottom wall of said chamber for passing vapors released from said deactivated liquor in said container upwardly through said condenser chamber for heating said undeactivated liquor.

9. A combined flash tank and condenser assembly as defined in claim 8, wherein said condenser chamber includes means for guiding said undeactivated liquor from said chamber undeactivated liquor inlet to said chamber undeactivated liquor outlet countercurrent to said vapor flow.

10. A combined flash tank and condenser assembly as defined in claim 9, wherein said means includes a plurality of angularly oriented inner and outer baffles arranged in series along the length of said chamber such that the undeactivated liquor follows a tortuous path from said chamber liquor inlet to said chamber liquor outlet.

11. A combined flash tank and condenser assembly as defined in claim 8 wherein said vapor inlet includes an upstanding separation wall for preventing undeactivated liquor from flowing out of said condenser chamber through said vapor inlet.

12. A method for deactivating calcium containing black liquor obtained from the cooking of comminuted cellulosic fibrous material comprising the steps of:
    (a) feeding undeactivated black liquor under pressure through a plurality of direct condensers arranged in series from first to last, and from the last direct condenser to a retention tank where said black liquor is deactivated by precipitation of the calcium;
    (b) during step (a), increasing the pressure successively between each of the plurality of direct condensers;
    (c) discharging deactivated spent liquor from said retention tank to a plurality of flash tanks arranged in series from first to last, wherein in each of said flash tanks, said deactivated liquor is partially vaporized; and
    (d) utilizing vapor formed in each of said flash tanks to heat undeactivated liquor in said direct condensers, wherein the direction of flow of said deactivated liquor is counter the direction of flow of said undeactivated liquor, and wherein the vapor from the first of said series connected flash tanks supplies heat to the next-to-last direct condenser, and the vapor from the last of said series connected flash tanks supplies heat to the first direct condenser.

13. A method as defined in claim 12, wherein live steam is added to the last direct condenser, prior to feeding said black liquor to said retention tank, to substantially increase the temperature of said black liquor.

14. A method as defined in claim 13, wherein the addition of live steam to said last condenser increases the temperature of said black liquor to about 150° C.

15. A method as defined in claim 12, wherein with the exception of the last direct condenser, each of said direct condensers and an associated flash tank are incorporated in a single vessel, so that vapor which flashes in the flash tank is employed to heat black liquor in the condenser.

* * * * *